June 8, 1954 P. H. WERENFELS ET AL 2,680,778

COLOR SYNCHRONIZATION FOR COLOR TELEVISION

Filed Feb. 23, 1951

3 Sheets-Sheet 1

INVENTORS
PETER H. WERENFELS AND
GEORGE W. BAIN, JR.

BY [signature]
ATTORNEY

COLOR SYNCHRONIZATION FOR COLOR TELEVISION

Filed Feb. 23, 1951 3 Sheets-Sheet 2

INVENTORS
PETER H. WERENFELS AND
GEORGE W. BAIN, JR.
BY
ATTORNEY

COLOR SYNCHRONIZATION FOR COLOR TELEVISION

Filed Feb. 23, 1951

INVENTORS
PETER H. WERENFELS AND
GEORGE W. BAIN, JR.
BY
ATTORNEY

Patented June 8, 1954

2,680,778

UNITED STATES PATENT OFFICE 2,680,778

COLOR SYNCHRONIZATION FOR COLOR TELEVISION

Peter H. Werenfels, Lawrenceville, and George W. Bain, Jr., New Brunswick, N. J., assignors to Radio Corporation of America, a corporation of Delaware Application February 23, 1951, Serial No. 212,264

11 Claims. (Cl. 178—5.4)

This invention relates to sequential color television systems and in particular it relates to color synchronization circuits for line sequentially presented color signals.

Since most proposed systems of field scanning for line sequential color television signals start out upon a different color line for each successive field, it is necessary to properly color synchronize the line sequence patterns at the transmitter and receiver.

Systems have been proposed for color synchronization of line sequential color signals. One very satisfactory system is shown and described in the copending United States application of L. E. Barton, Ser. No. 207,109, filed January 22, 1951 entitled "Field Decoding for Line Sequential Color Television." Such systems utilize color television signals much like the standard signals presently in use in black and white television systems. Color synchronization means are provided which are responsive to the initial horizontal or line synchronizing pulse immediately following the vertical or field synchronizing pulse period. At the television camera, the initial line pulse for each field corresponds to the line of video intelligence for the initial color of the selected field scanning pattern.

In accordance with this invention the color sequence is synchronized throughout each field, no matter what form of field scanning pattern is used or what initial color is used in each succeeding field. In addition, color synchronization means are provided which will operate with either fixed line color sequence or other color sequences using conventional black and white type television signals comprising the 525 line 60 field standards.

According to this invention, a decoding circuit is provided which transforms pulses reoccurring at different frequencies into pulses of different amplitudes. Such a circuit in effect amplifies pulses as an inverse function of the separation time between the pulses. Thus, the line pulses from the composite television signals may appear at a greater amplitude than the vertical or equalizing pulses. Such a type of circuit is employed in combination with a ring counter sampling circuit, having one stage biased to operate only in the presence of high amplitude line pulses, to initiate the color sampling sequence with a single given color for each field.

However, when field scanning patterns are used in which each field starts with different colors of a predetermined pattern, an additional circuit is necessary to cause rejection of the initial lines of each field which start with a color other than the initial sampling color. Rejection of the initial lines corresponding to the undesired colors may be accomplished in the decoding circuit when the separation of the normal line pulses is decreased by inserting extra line pulses. These extra pulses are inserted between the initial line pulses of fields wherein the initial lines are of the undesired color which is to be rejected. Circuits are provided for inserting the extra pulses.

It is an object of the invention to provide color synchronization apparatus for initiating the line sequence pattern in response to the initial effective line pulse for each color field.

It is another object of the invention to provide an electronic system for field coding line sequential television signals transmitted in accordance with a standard composite signal waveform.

It is a further object of the invention to provide apparatus for initiating the color sampling for each field upon a given color and rejecting the initial lines for each field which correspond to another color.

Other objects and advantages of the invention will be made clear in connection with the following detailed description of the invention. A better understanding of the invention and its operation will be provided when the description is read in connection with the accompanying drawing, in which.

Figures 1, 2, 3, 4:
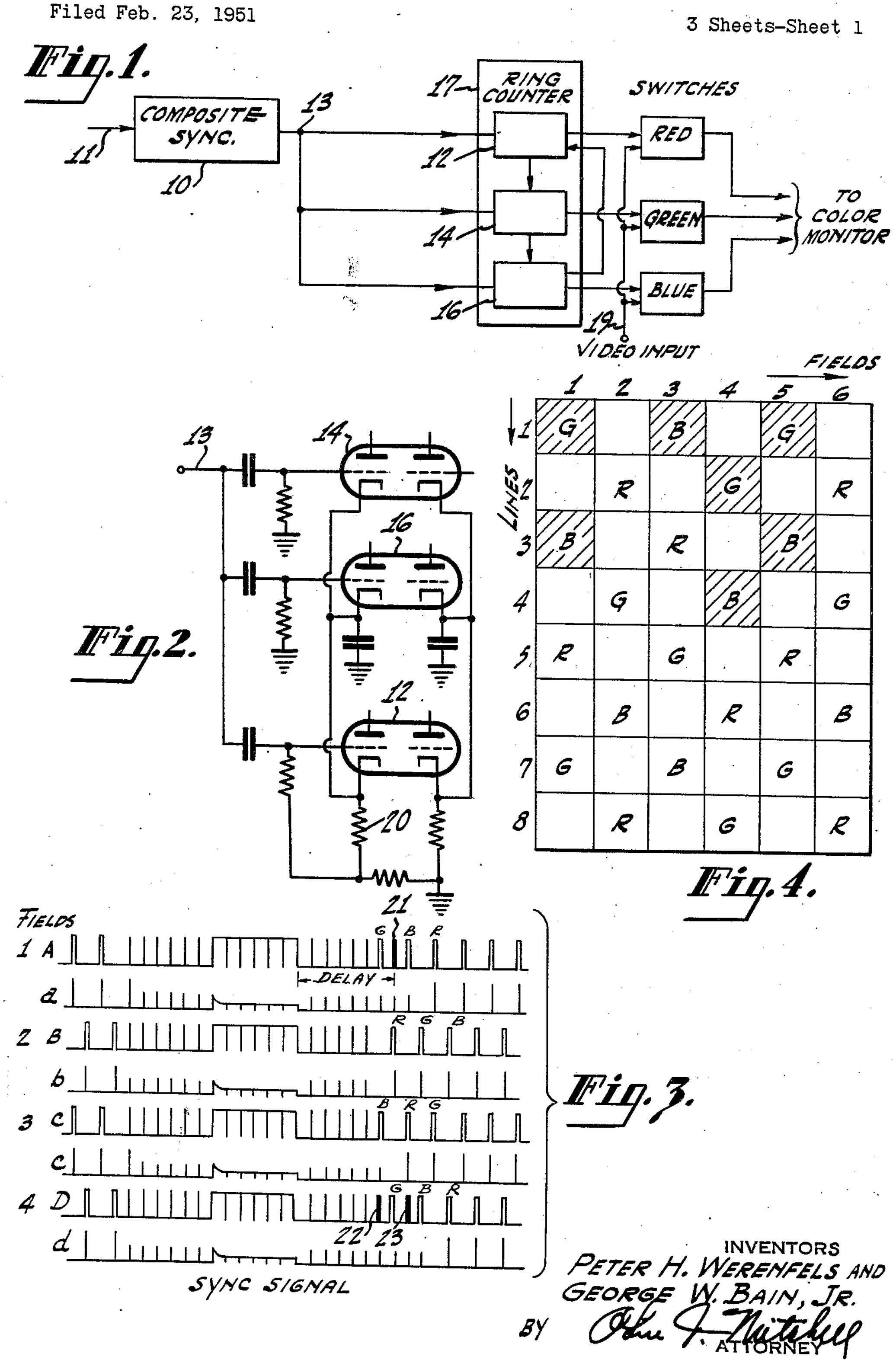
Figure 1 is a block diagram circuit of a portion of a television receiving or transmitting system embodying the invention.
Figure 2 is a schematic circuit diagram of a ring counter circuit constructed in accordance with the invention for use as an element thereof.
Figure 3 is a graphical illustration of waveforms used to indicate operation with line sequential color signals as proposed in one phase of the invention.
Figure 4 is a chart of a typical field scanning pattern used in conjunction with the waveforms of Figure 3 to explain the mode of operation of this phase of the invention.

Referring to the drawing, like components are designated by like reference characters in different figures. Referring in particular to Figure 1, an input composite synchronization signal is inserted to the synchronization decoder circuit 10 at the input lead 11. The decoder circuit 10 is preferably of the type described in the above-mentioned copending application. Output decoded signals at the lead 13 are inserted respectively at the stages 12, 14 and 16 of the ring counter 17. The ring counter in turn sequentially operates a color monitor by medium of intermediate gating circuits or switches for red, green and blue video components, arriving at the switches by means of the lead 19.

The line sequential signals are dispersed in proper sequence by operation of the ring counter circuit 17. However, since each field may start out upon a different color, means must be provided for initiating the proper sequence at the start of each succeeding field. This is accomplished in part by the decoder circuit 10, which provides at its output circuit line pulses of higher amplitude than the remaining composite synchronization signals. Therefore one stage 12 of the ring counter circuit 17 is biased for operation only in response to the incoming higher amplitude line pulses. This will cause the ring counter to initiate each field upon a single given color, which in this case is red. The unbiased counter stages 14 and 16 will operate with lower amplitude pulses derived from the equalizing pulses. Thus, the ring counter stage 12 is always set for operation when the initial line pulse for each field arrives. This system takes all pulses for triggering the ring counter from the same pulse source (the decoder 10) and therefore is simpler than circuits triggering different counter stages with different pulse sources.

In Figure 2 a typical biasing circuit for the ring counter is illustrated wherein the counter stage 12 will operate only in accordance with the high amplitude line pulses arriving at the input lead 13 from the synchronization decoder circuit 10. A section 20 of the cathode resistor in the left hand section of the biased counter stage 12 is common to the cathodes in each counter stage. This resistor section 20 is in the biasing circuit for the left hand input section to the counter stage 12. Therefore a suitable bias voltage is developed for blocking the counter stage during each vertical pulsing period. Only when the higher amplitude line pulses arrive will the counting sequence start for each field. Thus each field will start with a line sequence of red, green and blue.

Further means is necessary for proper color synchronization in each field, however, because in practice most proposed color scanning patterns do not normally cause each field to start out upon a given line color such as red, for which the above described circuit is designed to operate. Accordingly, the waveforms in Figure 3 and the chart in Figure 4 will illustrate the operation of circuits for rejecting the initial lines of colors other than red in each field. In accordance with the waveforms of Figure 3 it is assumed that the decoder circuit 10 is the aforedescribed circuit, which operates to provide an output pulse inversely proportional to the spacing between the input pulses. Therefore, the input composite waveforms "A," "B," "C" and "D," representing a repetitive group of signals in four successive fields, will appear as waveforms "*a*," "*b*," "*c*" and "*d*" at the ring counter stage.

As may be determined from the particular scanning pattern used in the chart of Figure 4, each initial line pulse of lines "A," "B," "C" and "D" will correspond to the color sequence green, red and blue. Also, every other field will have the initial line pulse spaced from the end of the equalizing pulse period by only a one-half normal line interval, because of the odd number of lines in the standard 525 line field provided for interlacing the field patterns. Therefore, in the signal for the first field, represented by the waveform "A," the initial high amplitude pulse is caused to correspond to the first red line pulse, by an extra line pulse 21 inserted between the green and blue line pulses. Thereby the spacing between the line pulses is effectively reduced. As far as the biased counter stage 12 is concerned, the initial lines of this field are rejected and the color signal is properly synchronized during this field.

The succeeding two fields need no additional pulses, since the second field, "B," initially starts on a red line and the third field, "C," initially starts on a blue line, which is rejected because it is normally separated only one-half the line interval from the equalizing pulses. However, again in the fourth field, "D," the waveform must be modified, in this instance by the addition of two pulses 22 and 23. Thus one pulse 22 between the equalizing period and the green pulse is needed as well as another pulse 23 between the green and blue line pulses. Since the field scanning pattern is of a repetitive nature, the fifth field will need one additional pulse, and the sequence repeats itself.

Thus the crosshatched sections of the chart in Figure 4 represent the lines rejected by operating the decoder circuit 10 upon the biasing circuit of the ring counter stage 12. Each field therefore starts out upon the initial color red and continues in the green, blue and red sequence. Accordingly, an operative color synchronizing system is provided which will cause line sequential signals to be laid down in proper sequence even when unusual field scanning patterns are used. It is to be recognized, of course, that the invention is not limited to the particular field scanning pattern shown, but any desired field scanning pattern may likewise be used by inserting the extra pulses at the proper positions in a portion of the composite signal corresponding to lines of the necessary fields.

Figure 5:
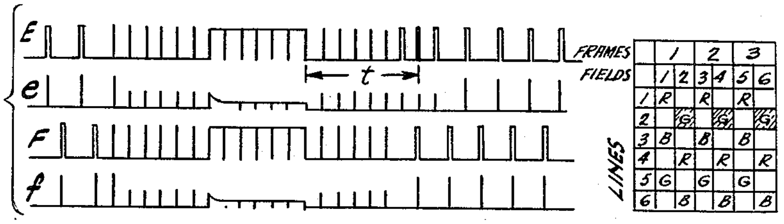
Figure 5 is a further graphical illustration of waveforms and accompanying field scanning chart used to explain the operation of the invention with a standard black and white type television signal for fixed line sequence color operation in accordance with a further phase of the invention.

One proposed color scanning pattern, known as the fixed line color sequence because each line of every field is scanned only with a selected color, affords additional advantages in combination with the present invention. As will be hereinafter discussed in more detail, simplified circuits are thus provided for inserting extra pulses. Figure 5 shows the fixed line color sequence in chart form and the associated synchronizing pulse waveforms for adapting the present invention for use therewith. Accordingly, for operation with a standard black and white type signal in a fixed line color sequence, a single pulse will be inserted in every other interlaced field as illustrated in the waveforms of Figure 5. The extra line pulse is inserted between the first two line pulses of every interlaced field "E," thereby affording proper color synchronizing operation in a manner similar to that described above for the more complicated color sequence.

As shown in Figure 5, the extra pulse is inserted in field "E" after a delay of time $t$ from the end of the field synchronizing pulse. The extra pulse is inserted in every other field. Those fields in which the pulses are added are normally interlaced, having the first line pulse offset by only a half line from the last equalizing pulse.

Figure 6:
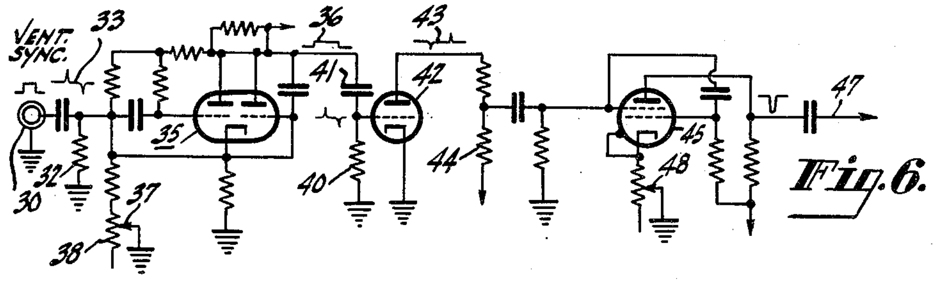
Figure 6 is a schematic diagram of a transmitter circuit of the invention used during operation with fixed line sequence color television signals.

The system, schematically shown in Figure 6, may be provided at the transmitter for inserting the extra pulse for operation with fixed line sequence signals. The vertical or field synchronization pulse appears at the input terminal 30 where the input capacitor 31 and resistor 32 provide a differentiating circuit therefor. This causes a sharp negative pulse 33 to be developed, corresponding to the trailing edge of the incoming vertical synchronization pulse. A conventional one shot pulse stretcher tube 35 is triggered by this negative pulse 33, and provides an output pulse 36 having a time duration of the delay time $t$, as required for proper insertion of the extra pulse between the first two line pulses. Delay adjustment 37 is afforded by the rheostat 38, in the time constant network of the pulse stretcher circuit to initially adjust the width of pulse 36 so that the extra pulse will appear at the proper time, as will hereinafter be explained.

The stretched or time delay pulse 36 is differentiated by the resistance capacity network 40 and 41, which comprise the input circuit to an amplifier and inverter stage 42. The trailing edge of the delay pulse 36 then appears as a short positive pulse 43 at the output impedance 44 of the amplifier circuit. This positive pulse triggers a succeeding one shot pulse forming tube 45. At the output terminal 47 of the circuit there is therefore provided a pulse arriving at the proper time and of the same characteristics as the line pulses so that it may be inserted in the composite signal wave at the transmitter to provide proper receiver color synchronization.

A bias adjustment 48 is provided in the cathode resistor circuit of the one shot pulse tube 45 so that a setting may be selected for triggering by input pulses exceeding a predetermined amplitude. Detailed operation of this type of pulse forming circuit is explained in the above mentioned copending Barton application. Since every other output pulse from the tube 45 will correspond in time to the initial line pulse of the field F, it will merely cause increased amplitude of the pulse and will not change the pulse frequency or spacing. To remove the resulting high amplitude, a diode clipping circuit may be provided, if desired. When constant output amplitude is thus provided proper operation of the described decorder is permitted at the receiver.

Figure 7:
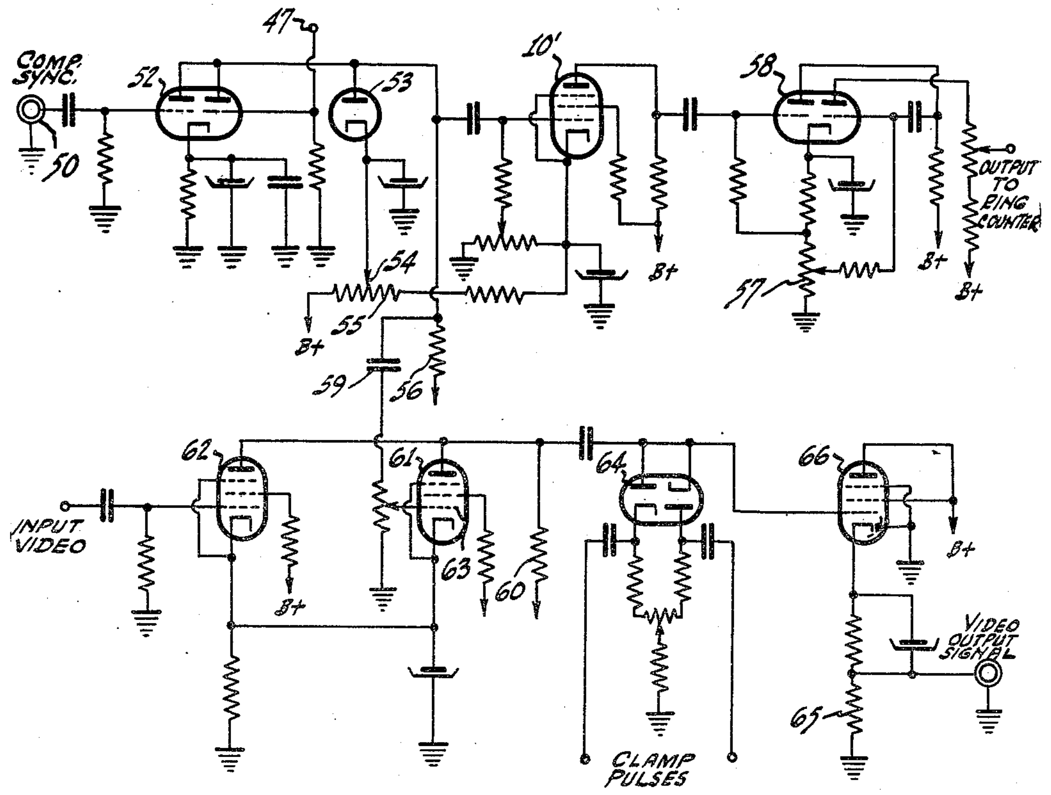
Figure 7 is a schematic diagram of a transmitter circuit used in providing the waveforms of Figures 3 and 5; and, Figure 8 is a schematic diagram of a transmitter circuit used during operation with line sequential color television signals having the field scanning pattern shown in the chart of Figure 4.

The extra pulses provided by the foregoing circuit are added to the composite transmitter output signal by a system such as shown in Figure 7. The normal composite synchronization pulse signal normally used is coupled to the input terminal 50, and is mixed in the conventional duo-triode mixer tube 52 with the extra pulses arriving at the mixer tube 52 from the output terminal 47 of the circuit shown in Figure 6. The diode clipper 53, in the anode output circuit of the mixer tube 52, is adjusted by the tap 54 on a positive biasing cathode resistor 55 to provide a constant output amplitude for the line pulses. Thus, as hereinbefore described, the extra pulse superimposed upon the initial line pulse for every other field is removed. The output synchronization signal developed across the mixer tube anode output resistor 56 is coupled to a pulse amplifier tube 10'. This tube 10', as hereinbefore mentioned, amplifies pulses with different time separation periods into pulses of different amplitudes. The output waveform is similar to that shown in Fig. 5 "*e*" and "*f*." The following double triode amplifier 58 both amplifies the high pulses and clips the small pulses in order to obtain a larger amplitude difference. The clipping level may be adjusted by a variable cathode resistor 57 for changing the bias only upon the output triode section.

The amplifier tube 58 provides an output synchronizing signal to a color synchronizing circuit at the color camera (not shown) such as the hereinbefore described ring counter color synchronizing circuit. Thus, the television camera is synchronized for each field by the same signals transmitted for synchronizing the television receiver.

A further output signal is taken from the mixer tube anode resistor 56 for combination with the transmitted video signal. This signal is coupled to the control electrode 63 of an amplifier tube 61 by the capacitor 59. At the anode resistor 60 of this tube 61, the video signal is also developed, since an input video amplifier tube 62 works into the common anode load resistor 60. A conventional clamping circuit 64 is provided in the grid input circuit of a succeeding cathode follower output tube 66. The video output signal for modulating the transmitter carrier is therefore developed across the cathode load resistor 65 of the cathode follower tube 66.

Figure 8:
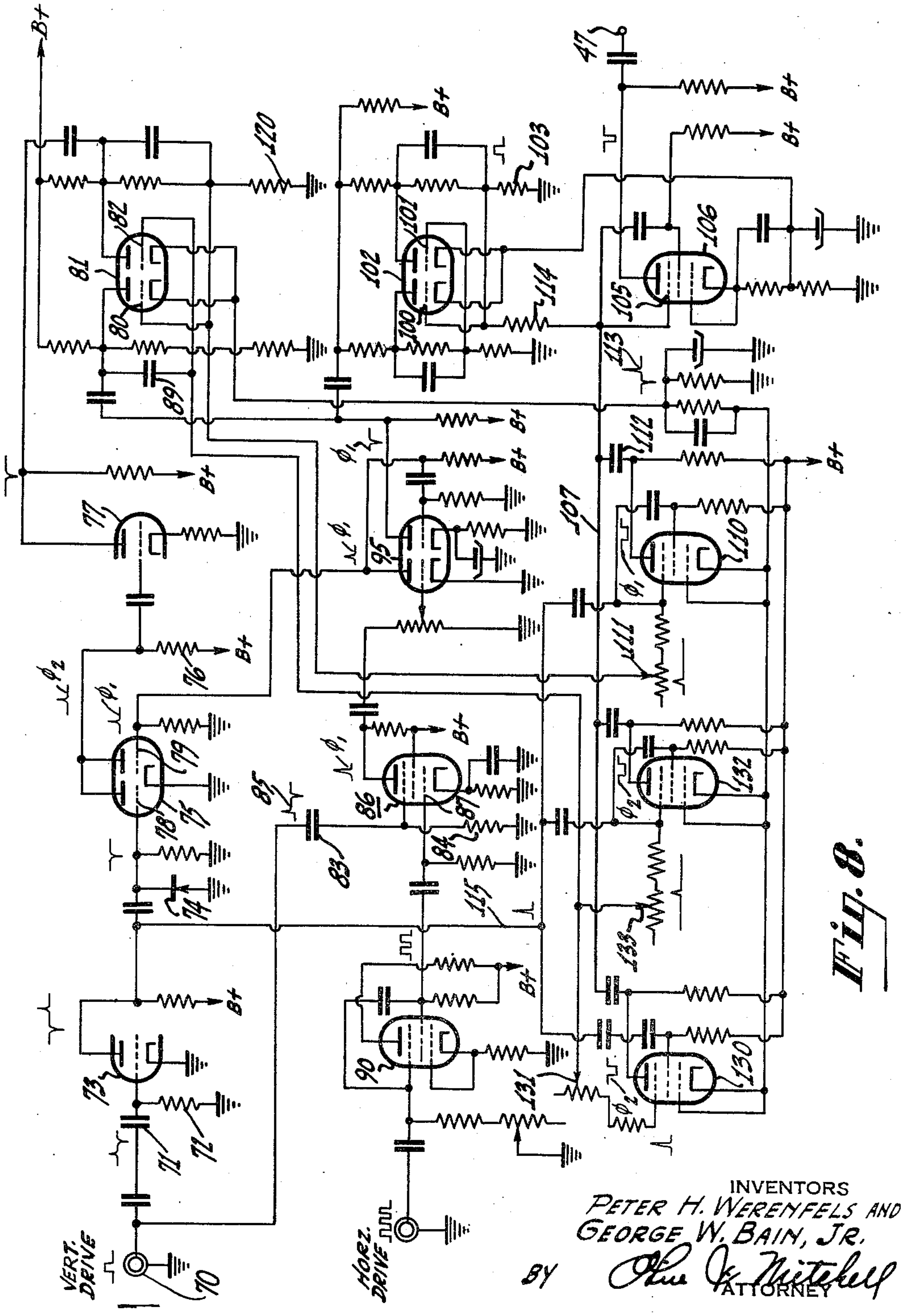

Figure 8 schematically represents a circuit for inserting the extra pulses required for color operation with the field scanning pattern shown in the chart of Figure 4. In operation, as may be generally determined from the waveforms of Figure 3, the extra pulses are added for one field and the normal line pulses are used for the next two consecutive fields. Therefore the pulse adding circuit may be switched off for two fields after every pulse insertion. Also it may be noted that during the operation period, the number of added pulses alternate so that a switching circuit may provide for sequentially adding either one or two pulses every other field. Since the pulse adding circuit is switched off when not needed the alternate pulse sequence need not be disturbed.

A more detailed operation of the circuit in Figure 8 corresponding to the above mentioned general theory of operation follows. The vertical synchronizing pulse is coupled to the circuit input terminal 70 and is coupled through a differentiating RC network 71, 72 to an amplifier and inverter tube 73. A diode rectifier 74 in the output circuit is used for clipping the positive pulse representing the trailing edge of the vertical signal. The negative pulse, which corresponds with the leading edge of the vertical signal, is therefore inserted at the first grid 78 of a parallel coupled coincidence cancelling amplifier 75. The negative pulse appears as a positive voltage pulse developed across the output resistor 76 unless a corresponding positive pulse, coincidently arrives at the second grid 79 of the coincidence amplifier 75. As will be explained later, the coincident positive cancelling pulse arrives every other field, which may be labeled as phase $\phi_1$, so that the output signal of the coincidence amplifier 75 will comprise a positive pulse occurring every other field and which may be considered as phase $\phi_2$. Phases $\phi_1$ and $\phi_2$ therefore will each indicate the relationship of pulses occurring every other field, where phase $\phi_1$ is present alternately when phase $\phi_2$ is not present. Phase $\phi_2$ occurs during the interlaced field or that field in which the initial line pulse is spaced half the line spacing interval from the last equalizing pulse.

The output pulses of phase $\phi_2$ at the tube 75 are amplified and inverted by the cascade amplifier tube 77 and are thereafter inserted at the control electrode 80 of bi-stable stage multivibrator tube 81. The multivibrator 81 may conduct in a normally stable state of operation for either section. A negative pulse arriving at the conductive section will change the state of operation and initiate conduction of the other section. Therefore, by inserting the negative pulse of phase $\phi_2$ on the control electrode 80 of the left hand section of the multivibrator tube 81, it is triggered for conduction of the right hand section during the corresponding field time period.

Triggering for each field occurs at a time corresponding to the leading edges of the vertical synchronization pulses because of operation of the differentiating circuit 71, 72 and the diode 74. Conversely, the multivibrator left hand section will conduct during the field corresponding to a pulse of phase $\phi_1$, because such a pulse is coupled to the control grid 82 of the right hand section by the capacitor 89.

To provide the pulses having phase $\phi_1$, the input vertical synchronization pulse, arriving at input terminal 70, is differentiated by the resistance capacity network 83, 84 at the input suppressor grid circuit of a gating tube 86. The sharp positive pulse 85, corresponding to the leading edge of the vertical synchronization pulse, is gated for every other field at phase $\phi_1$ by operation of an input signal on the control grid 87 of the gating tube 86.

The gating signal is provided by a pulse stretcher tube 90 at which the transmitter horizontal drive signals are inserted. These signals comprise a steady train of pulses at line frequency. The pulse stretcher circuit is a one shot oscillator similar to that containing the tube 45 illustrated in Figure 6. It functions to stretch each input line pulse to a width causing it to extend half the line spacing distance. Thus one stretched pulse every other field will coincide with the leading edge pulse of the differentiated vertical pulse. This occurs only when the normal fields "B" and "D" have one half the line spacing between the last line pulse and the equalizing pulses. Thus, when the interlaced fields occur, such as "A," "C," which have the initial line pulse offset by one half the normal line interval, the line pulse will not be stretched enough so that the tube 86 is gated for the positive input pulse on the suppressor grid. Therefore output pulses from the gating tube 86 occur once every other field at phase $\phi_1$.

The gating tube output pulse is amplified by the left hand section of the succeeding duo-triode tube 95 and therefrom is coupled to the control electrode 79 of the coincidence canceller tube 75 in the positive sense to cancel out the input negative pulses arriving for each field and there provide an output pulse of phase $\phi_2$, as hereinbefore described. The gating tube output pulse is also coupled to the right hand section of the tube 95, and is amplified and inverted to appear at the right hand control electrode 82 of the multivibrator circuit 81. Operation of the multivibrator 81 upon arrival of the pulse has been hereinbefore described.

The pulse at phase $\phi_1$ is also inserted at both input electrodes 100 and 101 of the multivibrator tube 102 which has a conventional multivibrator circuit for bi-stable operation. Since the pulses arrive every other field at phase $\phi_1$, the tube is alternately switched for conduction in each section for two consecutive fields, starting with the normal fields, "B" and "D" rather than with the interlaced fields. Therefore the multivibrator 102 is used for switching the final pulse output stage off for fields "B" and "C" and on for fields "A" and "D."

Switching bias voltage is developed across the resistor 103 of the multivibrator 102, and is used to bias the suppressor electrode 105 of a one shot oscillator tube 106 used as the final pulse output stage, and having a circuit similar to that of oscillator tube 90. The oscillator 106 provides output pulses, similar to the normal line pulses, which are inserted in the composite synchronizing signal identically as those from the output terminal 47 of the circuit in Figure 6. The output pulses are generated when driving pulses arrive at the input electrode 105 of the oscillator 106 by way of the input lead 107 during the fields "A" and "D," when the right hand section of multivibrator 102 is not conducting. The driving pulses arriving on lead 107 are delayed to appear later than the trailing edge of the vertical synchronization pulse by an amount causing them to occur midway between the initial normally spaced line pulses.

The single pulse for field "A" is provided by the circuit of tube 110 which serves as a pulse stretcher having a variable resistor 111 in the time constant network for adjusting the output pulse width to correspond with the above mentioned delay (shown in Figure 3A). The input bias voltage to the suppressor grid of tube 110, as developed across the output resistor section 120 of the multivibrator 81, serves to gate the tube to allow pulsing only for every other field.

The triggering pulse is derived from the trailing edge of the vertical drive pulses arriving at lead 115. It is noted that it is desirable to switch the multivibrator tube 81 at the leading edge of the vertical drive, so that there are no transients present when the additional synchronization output pulses are derived and added by tube 110. Those output pulses, occurring in tube 110 at the start of every other field "A" and "C," are coupled to the lead 107 by the capacitor 112 and arrive at the suppressor input grid 105 of the output single shot oscillator tube 105 as a differentiated wave 113 because of the combined R. C. time constant of capacitor 112 and the series resistors 114 and 103. Thus the output oscillator 106 operates only when biased on by the multivibrator 102 at the same time the positive portion of pulse 113 is present. Therefore the single added pulse is properly inserted only in field A.

Similarly, a pair of added pulses are provided for insertion in field "D" by the additional pulse stretcher tubes 130 and 132, which provide output pulses during phase $\phi_1$ when the left hand section of the multivibrator 81 is not conducting. The delay time of the first tube 130 is adjusted by the resistor 131 to correspond to the delay necessary for the first inserted pulse. The delay of the second pulse stretcher tube 132 is adjusted for this delay plus a line separation period by the resistor 133 to provide the second inserted pulse. Both pulses are coupled by the lead 107 to cooperate the output oscillator 106 in a manner identical with the pulses developed at tube 110. The foregoing circuit therefore provides at the television transmitter the proper pulses at the output terminal 47' for color phasing operation in accordance with the scanning pattern of Figure 4.

It is, of course, to be recognized by those skilled in the art that in accordance with the teaching of this invention systems may be provided for operation with other field scanning patterns.

What is claimed is:

1. A line sequential color television synchronizing system comprising in combination, means providing a composite synchronizing signal having distinct groups of pulse components including line and field pulses, and wherein said line pulses have a greater time separation period than the time separation of said field pulses, means responsive to said composite signal to provide groups of corresponding pulses having amplitudes inversely proportional to said time periods, thereby providing said line pulses at higher amplitudes than the other pulses, a ring counter color gating circuit having a stage for each of a plurality of video signals which have a plurality of different color component signals and having one predetermined stage biased for operation only with said higher amplitude pulses, means connecting each stage of said ring counter circuit to the output circuit of said means responsive to said signal whereby said predetermined stage of said ring counter corresponding to a given color is initiated only with said high amplitude line pulses to effect color synchronization by starting each field with the initial line pulse for said given color, and the further stages of said counter being initiated by lower amplitude line impulses of said composite signal to maintain the counter sequence in synchronism over the entire color field and set the counter for operation at the beginning of each field.

2. A system as defined in claim 1 for operation with field scanning patterns having different initial color signals for successive fields whereby coding pulses are inserted in said composite wave to vary the time separation periods of the initial normally spaced line pulses of certain predetermined fields to cause the initial high amplitude line pulse to said given color of said sequence for every field.

3. In combination, a ring counter circuit having a plurality of stages, means providing pulses of varying amplitude comprising a composite wave train, said means connected to each stage of said counter for initiating operation thereof in accordance with pulses of said composite wave train, and means connected to a single stage of the counter to cause operation only when impinging pulses of greater than a predetermined amplitude are present, whereby the ring counting sequence is initiated at said single stage only when large amplitude pulses corresponding to certain selected pulses of said wave train are applied.

4. A line sequential color television synchronizing system comprising in combination, means providing a composite synchronizing signal having distinct groups of impulse components including line and field pulses, means utilizing said signal to provide said line pulses at a higher amplitude than the other impulse components, a ring counter color gating circuit comprising a stage for each of a plurality of video signals having a sequence of different color component signals, means initiating one predetermined stage of said ring counter corresponding to a given color only with said high amplitude line impulses to effect color synchronization with the initial line pulse for each field, means initiating the further stages of said counter by lower amplitude line impulses of said composite signal to reset the counter during the field pulse periods for sequential operation during the succeeding field beginning with said predetermined counter stage.

5. Means for inserting extra synchronizing pulses in a composite television synchronizing signal for line sequential color operation comprising in combination, a differentiating input circuit, means providing a vertical synchronizing pulse at said input circuit, a pulse stretching circuit for developing a stretched pulse from the differentiated vertical pulse of such length to provide a time delay whereby the trailing edge of the stretched pulse corresponds to a point midway between the first pair of normally spaced line pulses of every other field in said composite signal, differentiating means operating on said stretched pulses to provide a pulse at said trailing edge, and a pulse forming circuit driven by said last mentioned pulse to develop an extra line pulse for insertion in said signal.

6. Means as defined in claim 5 including a mixing circuit comprising a mixing amplifier having one input terminal for said standard signal and another input terminal for said extra line pulses, and a clamping diode connected in the output circuit of said mixing amplifier for removing said extra line pulse every other field when it is superimposed upon a normal line pulse.

7. Means as defined in claim 5 including a mixing circuit for said extra pulses and said standard signal, one output circuit connected to said mixing circuit for operation of a television transmitter color camera, and a second output circuit connected to said mixing circuit for modulating the television transmitter carrier wave.

8. A synchronizing system for line sequential television signals having field scanning patterns which initiate successive fields upon different colors comprising in combination, means providing a standard television synchronizing signal waveform, means for forming extra pulses at a time corresponding to the space midway between the initial normally spaced line pulses of each field, and means inserting said extra pulses between the initial pair of line pulses of each field spaced by the normal line pulse spacing, whereby the initial normally spaced line pulse corresponds to a line of video signals for a single color.

9. A system as defined in claim 8 for operation with fixed lines sequence line sequential operation wherein said last mentioned means only inserts a pulse between the initial pair of normally spaced line pulses in each interlaced field which has the initial line pulse spaced half the normal line pulse spacing from the equalizing pulse.

10. A system as defined in claim 9 wherein extra pulses are inserted in two successive fields, the first field having the initial line pulse separated from the equalizing pulses by normal line pulse spacing, including means preventing the extra pulses from being inserted in the following two successive fields, means providing a pair of pulses for the first of the first mentioned fields, each pulse occurring between successive pairs of normally spaced line pulses and means providing a single pulse for the last of the first mentioned fields to occur between the first pair of normally spaced line pulses.

11. Means for alternately inserting one or two extra line pulses in the standard synchronization pulse waveform of two successive television fields comprising in combination, means selecting pulses corresponding to one edge of vertical synchronizing pulses of said standard waveform, means separating said pulses into a pair of phases, each phase occurring every other field in the absence of the other, pulse forming means providing said extra line pulses for insertion in said waveform, switching means operating from said pulses of both phases to alternately switch said pulse forming means on and off for periods of two successive fields, means for providing a pair of driving pulses corresponding to two extra line pulses for insertion between initial successive pairs of normally spaced line pulses, means actuating said last mentioned means from pulses of one of said phases to cause operation every other field, means for providing a single driving pulse corresponding to an extra line pulse for insertion between the initial pair of normally spaced line pulses, means activating said last mentioned means from pulses from the other of said phases to cause operation every other field when the means for providing two extra pulses is idle, and means connecting both said extra pulse driving means to said pulse forming means whereby the extra line pulses are formed alternatively during two successive fields.

References Cited in the file of this patent

UNITED STATES PATENTS

| Number | Name | Date |
|---|---|---|
| 2,406,760 | Goldmark | Sept. 3, 1946 |
| 2,529,666 | Sands | Nov. 14, 1950 |
| 2,539,440 | Labin | Jan. 30, 1951 |
| 2,545,957 | Kell | Mar. 20, 1951 |
| 2,546,972 | Chatterjea | Apr. 3, 1951 |
| 2,587,005 | Smith | Feb. 26, 1952 |